United States Patent
Poulad et al.

(10) Patent No.: US 9,430,187 B2
(45) Date of Patent: Aug. 30, 2016

(54) REMOTE CONTROL OF PROJECTION AND CAMERA SYSTEM

(71) Applicant: Amazon Technologies, Inc., Seattle, WA (US)

(72) Inventors: Navid Poulad, Sunnyvale, CA (US); Colter Earl Cederlof, San Jose, CA (US); Juli Anna Maria Satoh, San Jose, CA (US); Robert Allen Yuan, Belmont, CA (US); Steve Anthony Quento, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/723,800

(22) Filed: May 28, 2015

(65) Prior Publication Data

US 2015/0261497 A1    Sep. 17, 2015

Related U.S. Application Data

(62) Division of application No. 13/564,534, filed on Aug. 1, 2012, now Pat. No. 9,052,579.

(51) Int. Cl.
| | |
|---|---|
| *G06F 3/16* | (2006.01) |
| *G03B 21/14* | (2006.01) |
| *G01S 17/08* | (2006.01) |
| *G06F 3/01* | (2006.01) |
| *G03B 21/132* | (2006.01) |
| *G03B 21/30* | (2006.01) |

(52) U.S. Cl.
CPC .............. *G06F 3/167* (2013.01); *G01S 17/08* (2013.01); *G03B 21/145* (2013.01); *G06F 3/011* (2013.01); *G03B 21/132* (2013.01); *G03B 21/30* (2013.01)

(58) Field of Classification Search
CPC ... G03B 21/30; G03B 21/132; G06F 1/1626; G06F 1/1632; G06F 1/1643; G06F 1/1656
See application file for complete search history.

(56) References Cited

U.S. PATENT DOCUMENTS

| | | |
|---|---|---|
| 5,448,314 A | 9/1995 | Heimbuch et al. |
| 7,418,392 B1 | 8/2008 | Mozer et al. |
| 7,720,683 B1 | 5/2010 | Vermeulen et al. |

(Continued)

FOREIGN PATENT DOCUMENTS

| | | |
|---|---|---|
| WO | WO2011088053 | 7/2011 |

OTHER PUBLICATIONS

Office action for U.S. Appl. No. 13/564,534, mailed on Sep. 9, 2014, Poulad et al., "Remote Control of Projection and Camera System", 7 pages.

(Continued)

*Primary Examiner* — Sultan Chowdhury
(74) *Attorney, Agent, or Firm* — Lee & Hayes, PLLC

(57) ABSTRACT

A device includes a projection and camera system to create an augmented reality environment in which images are projected onto a scene and user movement within the scene is captured. The projection and camera system have a camera to image scattered IR light from the scene and compute time of flight values used in depth mapping of objects in the room. The system also has a projector to project the images onto the scene. The system controls the camera and projector mounted in a moveable head of a lamp with a motor mounted elsewhere in the lamp. In one implementation, the motor is mounted in the base of a table lamp.

20 Claims, 10 Drawing Sheets

(56) References Cited

U.S. PATENT DOCUMENTS

| | | |
|---|---|---|
| 7,774,204 B2 | 8/2010 | Mozer et al. |
| 8,303,120 B2 | 11/2012 | Hoshino et al. |
| 8,382,295 B1 | 2/2013 | Kim et al. |
| 8,414,130 B2 | 4/2013 | Pelah |
| 8,686,943 B1 | 4/2014 | Rafii |
| 8,935,005 B2 * | 1/2015 | Rosenstein ............ B25J 11/009 700/245 |
| 2009/0292614 A1 | 11/2009 | Reichow et al. |
| 2011/0122327 A1 * | 5/2011 | Kotani .................. F16M 11/40 348/744 |
| 2012/0223885 A1 | 9/2012 | Perez |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

REMOTE CONTROL OF PROJECTION AND CAMERA SYSTEM

CROSS-REFERENCE TO RELATED APPLICATIONS

This application is a continuation of co-pending U.S. patent application Ser. No. 13/564,534, filed on Aug. 1, 2012, and entitled "Remote Control of Projection and Camera System", which is expressly incorporated herein by reference in its entirety.

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection systems. Such improvements might include lighter weight, smaller form factors, and less obtrusive integration into the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras or other sensors, projectors, computing devices with processing and memory capabilities, and so forth. The projectors project images onto the surroundings that define the environment and the cameras or other sensors monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment. The architecture may be implemented in many ways. One illustrative implementation is described below in which an augmented reality environment is created within a room. The architecture includes one or more projection and camera systems. Multiple implementations of various projection and camera systems are described. To enhance user experience in some environments, loud or bulky components, or those that generate heat can be housed in parts of the architectures, which are likely to be further from the user's head while the projection and camera system is in use. For instance, in one implementation, the projection and camera system is implemented as a table lamp and the motors to control pan, tilt, and roll actions of one or both of the projector and camera are located in the base of the lamp while the projector and camera are located in the head of the lamp. In various implementations, drive mechanisms are configured to maintain control of the head while an arm connecting the base to the head is movable. In this way, the drive mechanisms maintain the connection between the motors in the base and the components in the head while the arm can be moved or bent independently or in conjunction with the motion control for the head via a flexible arm member such as a gooseneck, cable, chain, or belt, or a non-flexible lever, or other type of arm member. However, the various implementations of the architecture described herein are merely representative.

Illustrative Environment

Figure 1:
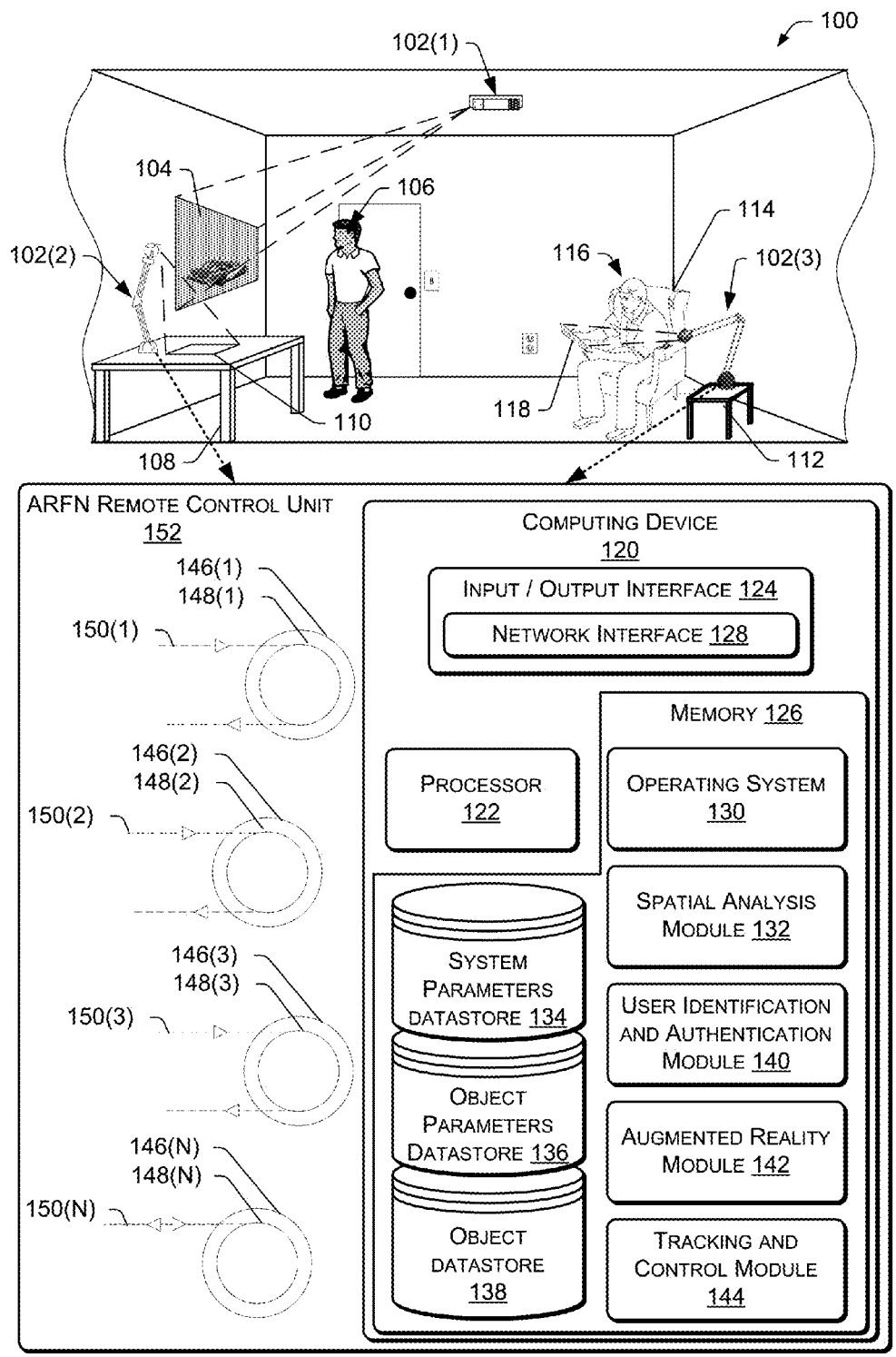
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction.

A second ARFN 102(2) is embodied as a table lamp, which is shown sitting on a desk 108. The second ARFN 102(2) projects images 110 onto the surface of the desk 108 with which the user 106 can consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 with which the user 116 can consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on in furniture, on the wall, beneath a table, and so forth. One implementation of an ARFN 102 is provided below in more detail with reference to FIG. 2.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions, which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between physical objects of the scene and virtual objects and information.

A system parameters datastore 134 is configured to maintain information about the state of the computing device 120, the input/output devices of the ARFN, and so forth. For example, system parameters may include current pan, tilt, and roll settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a voice print or a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. In addition to the augmented reality module 142, a tracking and control module 144 is configured to track one or more items within the scene and accept inputs from or relating to the items.

The tracking and control module 144 may be used to run a variety of motors 146(1), 146(2), 146(3), . . . , 146(N) that control the chassis, or in some instances the projector and/or camera housed therein, using a remote pull and/or push mechanism according to inputs from the environment. The illustrated motors include pan motor 146(1), which controls a panning action of the lamp head or can represent two motors that control panning of the camera and projector components individually. A tilt motor 146(2), meanwhile, controls a tilting action of the lamp head or can represent two motors that control tilting of the camera and projector components individually. A roll motor 146(3) controls a rolling action of the lamp head, e.g., from portrait to landscape, or can represent two motors that control rolling of the camera and projector components individually. In some embodiments, the roll action is performed by software, rather than a physical rolling motion of one or more of the components. In addition, some embodiments include an extension motor 146(N) to control extension and retraction of the arm connecting the lamp head to the base, although other motors or motor configurations are possible. The motors of the remote pull and/or push mechanism can each control a corresponding pulley, wheel, drum, sheave, sprocket, bar, or the like, 148(1), 148(2), 148(3), . . . , 148(N), which in turn transfers energy along a member 150(1), 150(2), 150(3), . . . , 150(N), to cause movement of the lamp head. In various implementations, the member 150 includes a cable, a chain, a belt, a lever, or the like. In various implementations, an ARFN remote control unit 152 contains computing device 120 and houses one or more of the motors 146, pulley, wheel, drum, sheave, sprocket, or bar 148, and/or at least a part of a member 150.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

First ARFN Implementation

Figure 2:
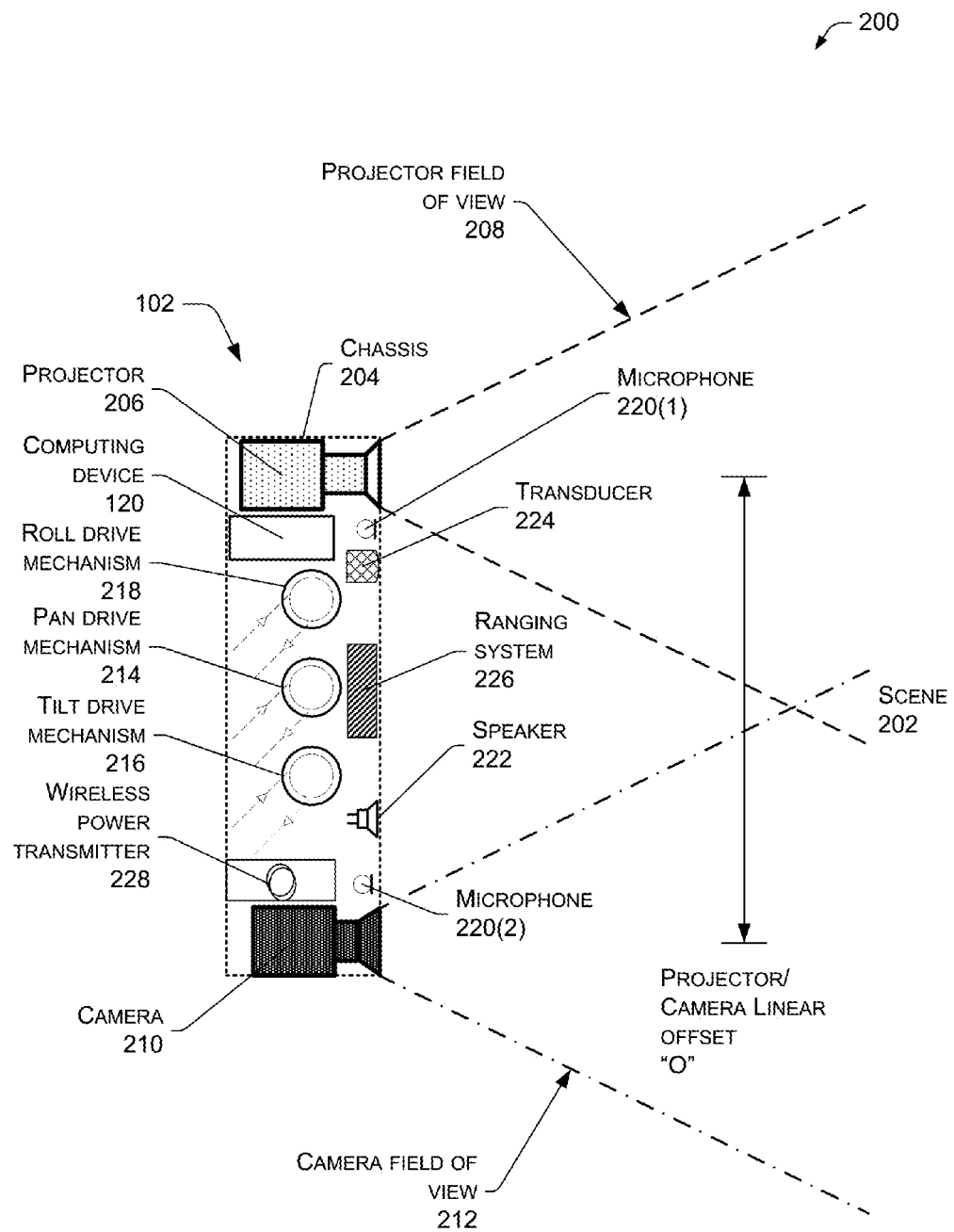
FIG. 2 shows a first implementation of a projection and image capturing system formed as an augmented reality functional node having a chassis to hold a projector and camera in spaced relation to one another and three wheels by which movement of the chassis can be controlled by a motor remote from the chassis.

FIG. 2 shows an illustrative schematic 200 of an augmented reality functional node 102(1) and selected components. The ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector, or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an infrared (IR) camera or an RGB camera that includes both ToF and RGB sensors. As used herein, "camera" can include any type of image sensor including heat sensors, IR sensors, and the like. The camera 210 has a camera field of view 212, which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor, a tilt motor, a roll motor, and so forth housed remote from the chassis 204. A pan drive mechanism 214 is configured to rotate the chassis 204 in a yawing motion due to torque applied to a pulley, wheel, drum, sheave, sprocket, or bar component by a member connected to the pan motor, controlled by a motor controller of the drive mechanism. A tilt drive mechanism 216 is configured to change the pitch of the chassis 204 due to torque applied to a pulley, wheel, drum, sheave, sprocket, or bar component by a member connected to the tilt motor, controlled by a motor controller of the drive mechanism. A roll drive mechanism 218 is configured to rotate the chassis 204 as from portrait to landscape due to torque applied to a pulley, wheel, drum, sheave, sprocket, or bar component by a member connected to the roll motor, controlled by a motor controller of the drive mechanism. By panning, tilting, and/or rolling the chassis 204, different views of the scene may be acquired. The spatial analysis module 132 may use the different views to monitor objects within the environment.

One or more microphones 220, such as microphone 220(1) and 220(2), may be disposed within the chassis 204, or elsewhere within the scene. These microphones 220 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 220 may be used to receive voice input from the user for purposes of identifying and authenticating the user. The voice input may be received and passed to the user identification and authentication module 140 in the computing device 120 for analysis and verification.

One or more speakers 222 may also be present to provide for audible output. For example, the speakers 222 may be used to provide output from a text-to-speech module, to playback pre-recorded audio, etc.

A transducer 224 may be present within the ARFN 102, or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 226 may also be provided in the ARFN 102 to provide distance information from the ARFN 102 to an object or set of objects, which can be used to determine the location of the object or set of objects. The ranging system 226 may comprise radar, light detection and ranging (LIDAR), ultrasonic ranging, stereoscopic ranging, and so forth. In some implementations, the transducer 224, the microphones 220, the speaker 222, or a combination thereof may be configured to use echolocation or echo-ranging to determine a distance from an ARFN, a location of an object, and spatial characteristics of the object.

A wireless power transmitter 228 may also be present in the ARFN 102, or elsewhere within the augmented reality environment. The wireless power transmitter 228 is configured to transmit electromagnetic fields suitable for recovery by a wireless power receiver and conversion into electrical power for use by active components in other electronics, such as a non-passive screen 118. The wireless power transmitter 228 may also be configured to transmit visible or non-visible light to communicate power. The wireless power transmitter 228 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. In addition, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 220 and speakers 222 may be distributed throughout the scene. The projector 206 and the camera 210 may also be located in separate chassis 204.

Figure 3:
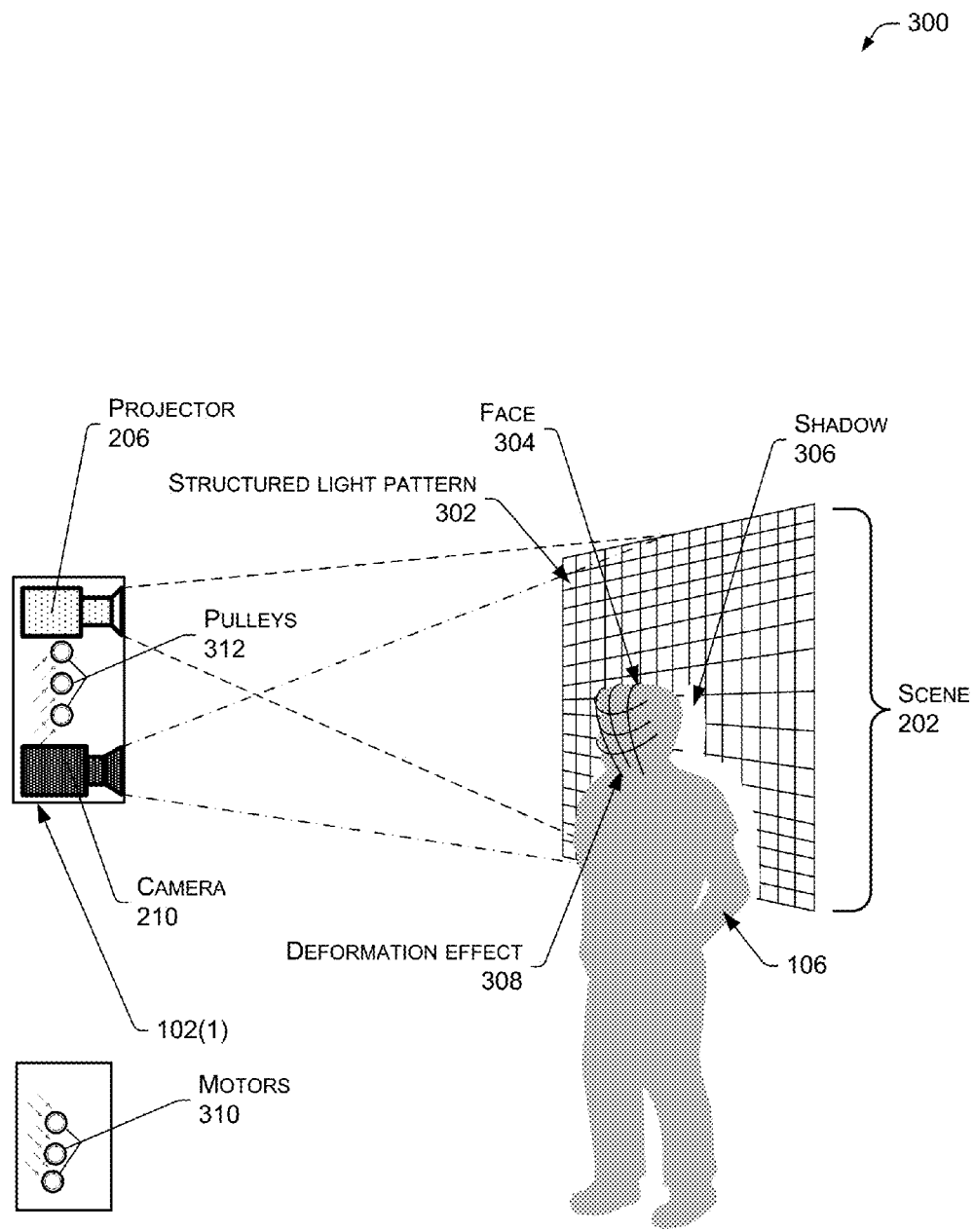
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths, which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that, given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instance, some images of the scene are processed by the spatial analysis module 132 to characterize the scene 202. Images of the scene as processed by the spatial analysis module can be transferred to tracking and control module 144, which controls motors 310 to reposition ARFN 102(1). As illustrated, motors 310 can be housed remote from projector 206 and/or camera 210 to minimize interference with the user experience from noise and heat generated by the motors. In the illustrated example, motors 310 are located in a separate housing at floor level and use cables, for example, located in a wall, to adjust pulleys 312 to reposition ARFN 102(1). In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

Second ARFN Implementation

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as can be represented by the ARFNs 102(2) and 102(3) in FIG. 1, removes the offset through a design that allows the projector and camera to share a common optical path. In implementations of this design, the form factor may be reduced. In the example shown in FIG. 1, the ARFNs 102(2) and 102(3) are embodied as common table lamps, which in some instances can represent a design that allows the projector and camera to share a common optical path. In implementations employing common and separate optical paths, the projector and camera reside in a head of the lamp and other components reside elsewhere such as in the arm and/or base of the lamp to minimize the amount of noise and heat produced in the head of the lamp.

Figure 4:
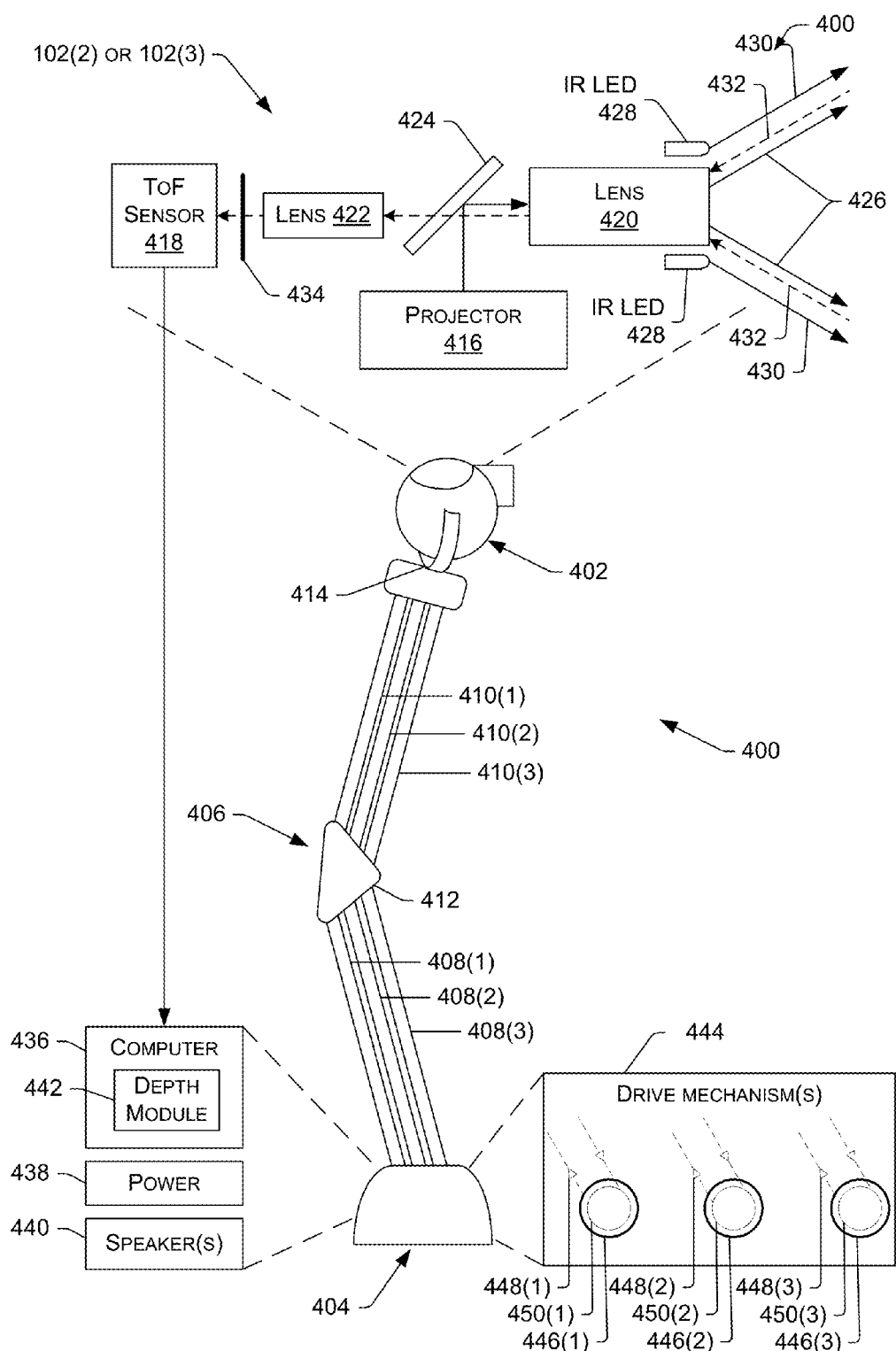
FIG. 4 shows a second implementation of a projection and image capturing system formed as a familiar type of furniture, such as a table lamp. In this implementation, the motors to control motion of the lamp head are located in the base of the lamp.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has three base members or rods 408(1), 408(2), and 408(3) connected to three head members or rods 410(1), 410(2), and 410(3) via a joint connector 412. Other configurations of the arm mechanism 406 may be used.

In the illustrated implementation, the head 402 is connected to the arm mechanism 406 via a universal connector 414 that enables at least three degrees of freedom (e.g., along tilt, pan, and roll axes). The universal connector 414 is described below in more detail with reference to FIG. 5. In other implementations, the head 402 may be mounted to the arm mechanism 406 in a fixed manner, with no movement relative to the arm mechanism 406, or in a manner that enables more or less than two degrees of freedom.

The head 402 holds several components, including a projector 416 and a time of flight (ToF) sensor 418. In this example, the ToF sensor 418 measures IR signal reflections from objects within the scene. The ToF sensor 418 may be implemented as a standalone sensor, or as part of a camera. The head also contains one or more lenses, including a first lens 4380 and a second lens 422. The first lens 4380 may be implemented in a number of ways, including as a fixed lens, wide-angle lens, or as a zoom lens. When implemented as a zoom lens, the lens may have any zoom range, with one example being 17-50 mm. Use of a zoom lens also offers additional advantages in that a zoom lens permits a changeable field of view, which can increase image resolution for better gesture recognition. Further, by zooming in, the device can decrease the field of view and enable the ability to discern fingers that were not resolved in non-zoomed (larger field of view) state. The lens 4380 may further include a motorized focus, a motorized zoom, and a motorized iris.

In some implementations, the second lens 422 is provided to adjust for differences between two imagers, for example a projection imager and the ToF imager. This allows for the device to set relative coverage of the two imagers (e.g., overscan/underscan).

The projector 416 projects an image that is reflected off an angled beam splitter 424 and out through the lens 420. The beam splitter 424 may be, for example, embodied as a dichroic beam splitter having a coated prism assembly that employs dichroic optical coatings to divide light. The projected image has a field of view represented by the outgoing pair of arrows 426. In this manner, the visible and high intensity light from the projector can be zoomed for image projection on a wide range of surfaces, from near view to far view surfaces.

One or more IR emitters 428, such as IR LEDs, are positioned in the head 402 relative to the lens 420. The IR emitters 428 direct IR light in the direction of the projected image to illuminate the scene onto which the images are being projected. The IR emitters 428 may be arranged such that the illumination field is wider than the projected field, as represented by the outgoing pair of arrows 430.

The IR signals are scattered from objects in the scene and returned to the lens 420, as represented by the incoming pair of arrows 432. The captured IR signals are passed through the lens 4380 and through the dichroic beam splitter 424 to the secondary lens 422. The IR signals are then optionally passed through an IR filter 434 (or other filter type) to the ToF sensor 418. In other implementations, the IR signals may be passed directly from the lens 422 to the ToF sensor 418, without going through the IR filter 434. Accordingly, the IR signals are emitted out from the head 402, scattered by the objects, and collected by the head 402 for capture by the ToF sensor 418 as a way to image the scene. This technique is performed in lieu of using structured light, as implemented in the implementation of the first ARFN 102 (1).

It is noted that, in other implementations, the projector 416 may be arranged to project an image that is passed through the beam splitter 424 and out through the lens 420, rather than being reflected by the beam splitter 424. In this arrangement, the returning IR signals maybe received back through the lens 420 and reflected by the beam splitter 424 to the lens 422 and ToF sensor 418. Said another way, the projector 416 and IR components (i.e., ToF sensor 418, lens 422 and optionally filter 434) may be swapped so that the returning IR signals are reflected by the beam splitter 424 rather than the projected image. Other arrangements may also be possible where at least part of the optical path is shared by the projection and depth capture.

The lamp-based ARFN 102(2) or 102(3) may also be equipped with one or more components in the base 404. In this example, a computer 436 resides in the base 404, along with power components 438, one or more speakers 440, and one or more drive mechanisms 444, which can include motors 446(1), 446(2), and 446(3), to control via a member such as a cable, chain, belt, or lever 448(1), 448(2), and 448(3), a pulley, wheel, drum, sheave, sprocket, or bar 450(1), 450(2), and 450(3). The computer 436 may include processing and memory to execute instructions as a motor controller of the drive mechanism. To measure a time of flight for an IR signal (or other modulated light output), the computer 436 may execute or communicate with a depth module 442. The time-of-flight value may be derived as a function of a time lapsed between emission from an IR LED 428 and capture by the ToF sensor 418. Alternatively, the time-of-flight value may be derived as a function of the phase difference between the modulated light output and the returned light. The depth module may be implemented in software or hardware. It is noted that in other implementations, some of the components shown as residing in the base 404 may reside in the head 402 or arm mechanism 406. For instance, the computer 436 may be located in the head, and the speakers may be 440 may be distributed in multiple locations, including the base, arm mechanism, and/or the head. As another example, the computer 436 may be located in the head, and parts of one or more of the drive mechanisms 444, motors 446, members 448 and/or a pulley, wheel, drum, sheave, sprocket, or bar 450 can be located in the arm mechanism 406 including joint connector 412.

Notice that in this implementation of FIG. 4, the projector 416 and the sensor 418 share a common optical path through a common lens 420. As a result, the ARFN may be made more compact to a smaller form factor, as one set of lenses are removed in this design as compared to the offset design for FIG. 2. In another implementation, the illumination system can share the same optical path as the projector 416 and the ToF sensor 418.

Figure 5:
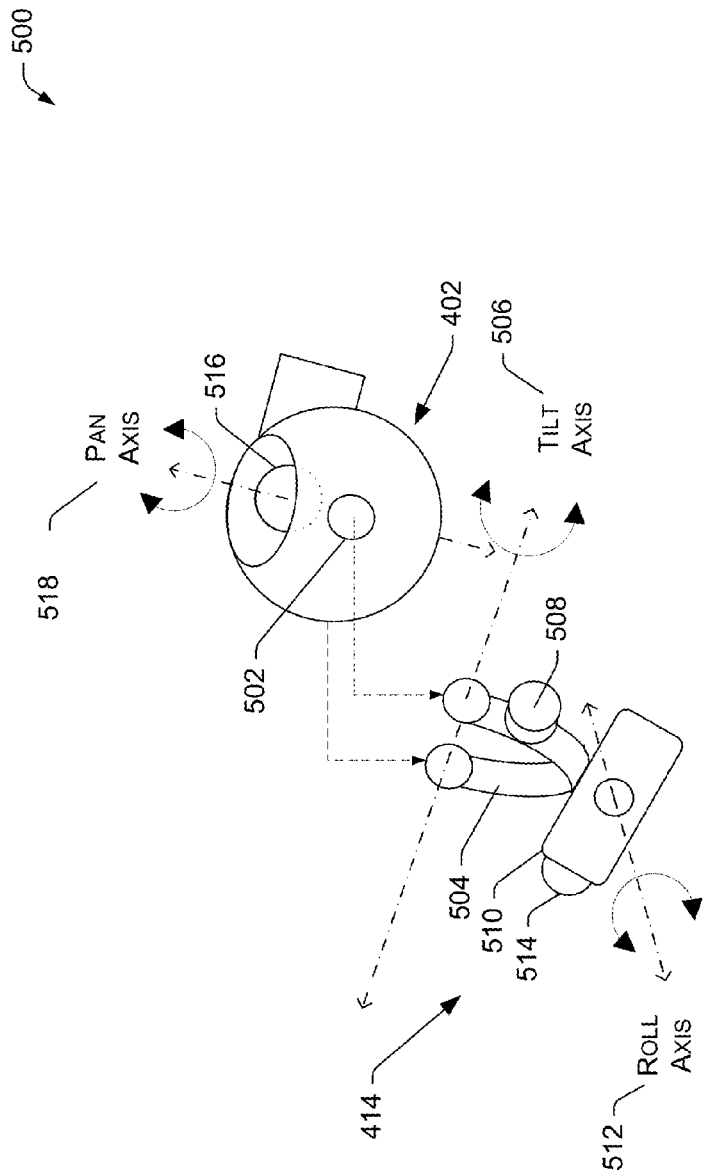
FIG. 5 shows an exploded view of a head and universal mount of the lamp implementation shown in FIG. 4.

FIG. 5 shows an exploded view 500 of the head 402 and the universal mount 414 of the lamp implementation shown in FIG. 4. Here, the head 402 is generally spherical, although it may be made of any shape, size or form factor. Here the head 402 has two mounting members 502 on opposing sides of the sphere. The mounting members 502 may be pivotally mounted within a U-shaped cradle 504 to facilitate rotation about a tilt axis 506, although other mounting and/or cradle configurations are possible. A tilt motor 508 may be included to move the head 402 about the tilt axis 506. In other implementations, the tilt motor 508 is located in the joint connector or the base of the lamp.

The illustrated U-shaped cradle 504 is movably mounted relative to structural bracket 510 although other mounting configurations are possible. The U-shaped cradle 504 may pivot about a roll axis 512. A roll motor 514 may be included to pivot the U-shaped cradle 504 and head 402 about the roll axis 512. In other implementations, the roll motor 514 is located in the joint connector or the base of the lamp.

The two mounting members 502 are illustrated as movably mounted relative to a pan motor 516 although other mounting configurations are possible. The pan motor 516 may be included to pivot the head 402, or components housed therein, about the pan axis 518. In other implementations, the pan motor 516 is movably mounted relative to structural bracket 510 or located in the joint connector or the base of the lamp.

Although one configuration is illustrated in FIG. 5, in other implementations, the order in which structural bracket 510, U-shaped cradle 504, mounting members 502, and motors 508, 514, and 516 are connected can differ in any way such that ARFN 102 is able to achieve the three described range of motion movements of tilt, pan, and roll.

Figure 6:
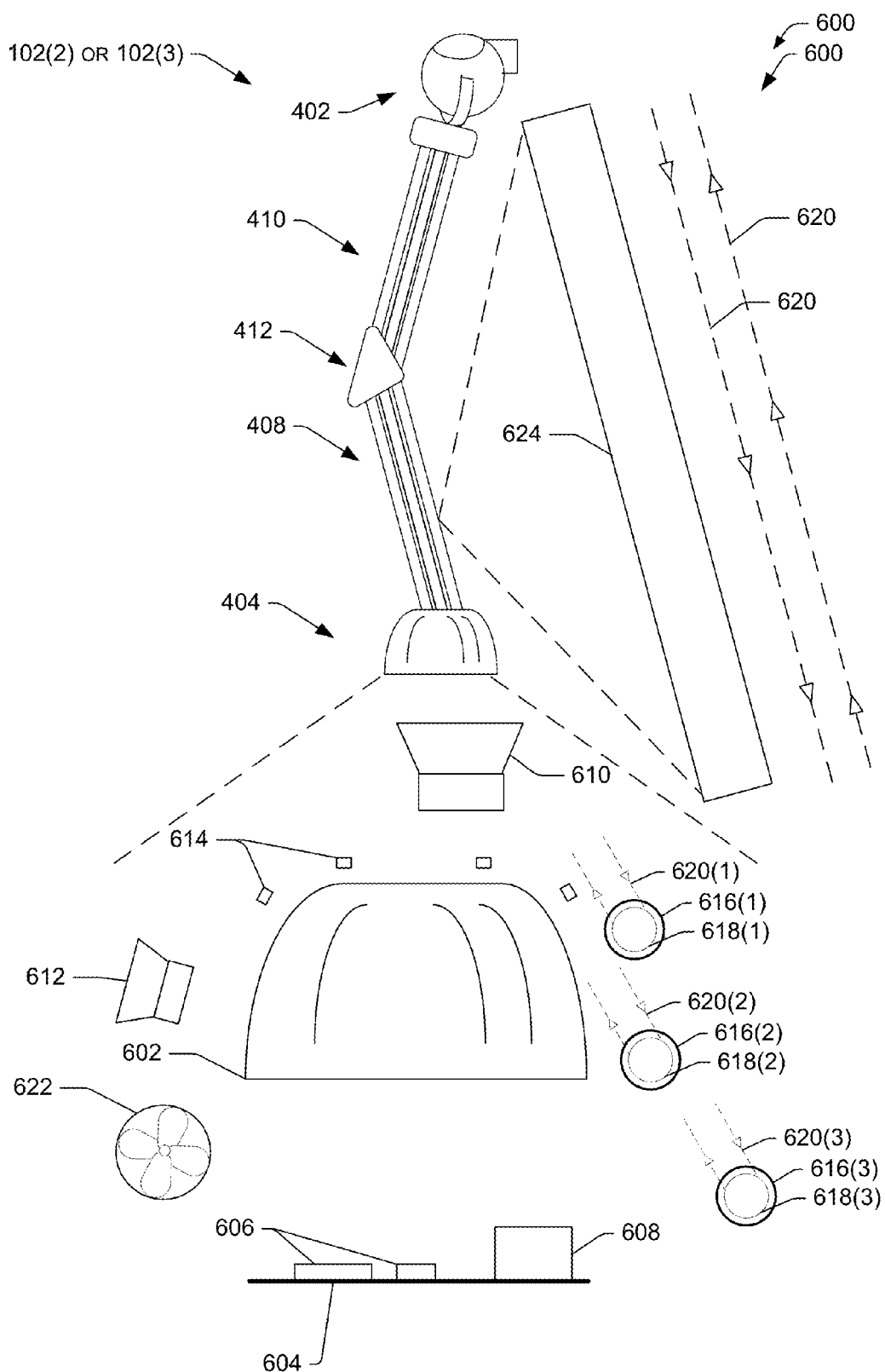
FIG. 6 shows an exploded view of components in an arm and a base of the lamp according to one implementation.

FIG. 6 shows an exploded view 600 of components in the base 404 and an arm including members 408 and 410 of the lamp-embodied ARFN 102(2) or 102(3) according to one implementation. In some instances, a single member runs through joint connector 412 and takes the place of members 408 and 410. The base 404 includes a housing 602 formed of a material suitable to encase the active components and to provide sufficient weight to hold the lamp on a surface while the head and arm mechanism are moved and fully extended in various directions. A printed circuit board (PCB) 604 is mounted in the bottom of the housing 602 and defines the main logic board of the ARFN 102. The PCB 604 holds various computing components 606 of computer 436, such as processor(s), memory, and I/O interfaces. A power supply 608 is also provided on the PCB 604.

One or more speakers may be arranged within the housing 602. Two speakers 610 and 612 are illustrated in FIG. 6. The first speaker 610 is a low frequency speaker, while the second speaker 612 has a mid to high frequency range. One or more microphones 614 may also be arranged in the base housing 602.

Components of one or more drive mechanisms can also be arranged within the housing 602. In the illustrated example, three motors 616 are illustrated in FIG. 6. The first motor, pan motor 616(1), uses a pulley 618(1) to push or pull member 620(1) in a manner that translates torque to rotate head 402 in a yawing motion. The second motor, tilt motor 616(2), uses a pulley 618(2) to push or pull member 620(2) in a manner that translates torque to change the pitch of head 402. The third motor, roll motor 616(3), uses a pulley 618(3) to push or pull member 620(3) in a manner that translates torque to rotate head 402 in a rolling motion, which may alter an orientation of the projector (e.g. to alter a projection from a portrait orientation to a landscape orientation). In various implementations, one or more of the components of the drive mechanisms, including a motor 616 and/or pulley 618, can be encased in a housing included in joint connector 412. Although the mechanisms to impart torque are illustrated as pulleys 618, one of ordinary skill will recognize that various other configurations are available including replacing a pulley with a wheel, drum, sheave, sprocket, or bar. One or more cooling fans or heat sinks 622 may also be included in the base 404.

The arm including members 408 and 410 includes a housing 624 formed of a material suitable to encase the active components. One or more members 620 of a drive mechanism can be arranged within housing 624. Two members 620 are illustrated as being encased within housing 624 in FIG. 6. In various implementations, a member 620 can include a cable, a chain, a belt, or a lever suitable to transfer torque from pulley 618 to head 402. In the case of a belt member, the two members 620 illustrated from housing 624 may represent two sides of the same belt. Moreover, one or more of pulleys 618 or member 620 can be configured with teeth or other mechanisms to prevent or minimize slippage of member 620 on pulley 618. Alternately, slippage can be prevented or minimized by affixing member 620 to pulley 618, such as when pulley 618 is implemented as a bar. Alternatively, slippage can be allowed to protect a motor 616, gears, or member 620 and/or to allow manual repositioning including accidental repositioning, such as if the head is accidentally hooked on a piece of clothing of a user or impacted by a user's hand. A position sensor (e.g. a potentiometer) can be used to monitor the position of head 402 to account for slippage.

Although housing 624 is illustrated with two members 620, which can represent a belt member to control roll action, additional members 620 of various types can be included in housing 624. In various implementations, the drive mechanisms are configured to maintain control of the head 402 while the arm, including members 408 and 410, is movable. In this way, the drive mechanisms maintain the connection between the motors 616 and the axes of motion in the head 402 while the arm can be moved or bent independently or in conjunction with the motion control for the head 402.

Figure 7:
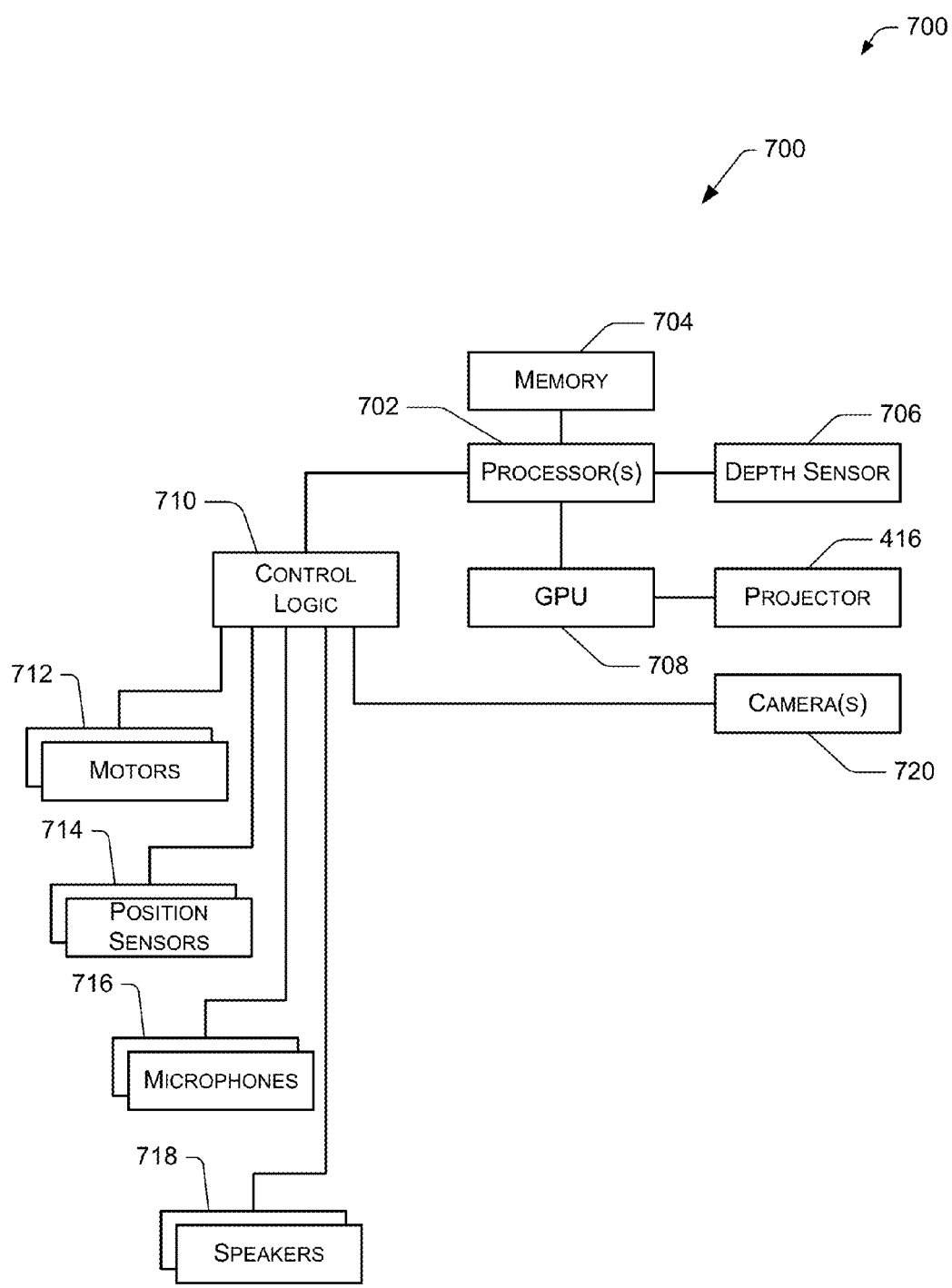
FIG. 7 is a block diagram of functional components that may be used in the implementation of FIG. 4.

FIG. 7 shows functional components 700 that may be implemented as part of the lamp-embodied ARFN 102(2) or 102(3) of FIG. 4. The functional components 700 include one or more processors 702 coupled to memory 704. A depth sensor 706 may be coupled to the processor 702, formed as part of the processor 702, or implemented as firmware/software stored in the memory 1004 and executed on the processor 702. A separate graphics processing unit (GPU) 708 may be coupled to the processor 702 to generate the images to be projected by the projector 416.

Control logic 710, such as a field programmable gate array (FPGA), is shown coupled to the processor 702 to control various electrical and mechanical components. For instance, the control logic 710 may be coupled to control various motors 712, such as the tilt motor 508, the pan motor 514, and the roll motor 516 of the universal connector 414 in FIG. 5. The control logic 710 may also be coupled to control position sensors 714, microphones 716 (e.g., microphones 614 in FIG. 6), speakers 718 (e.g., speakers 610 and 612 in FIG. 6), and camera 720.

Illustrative Processes

Figure 8:
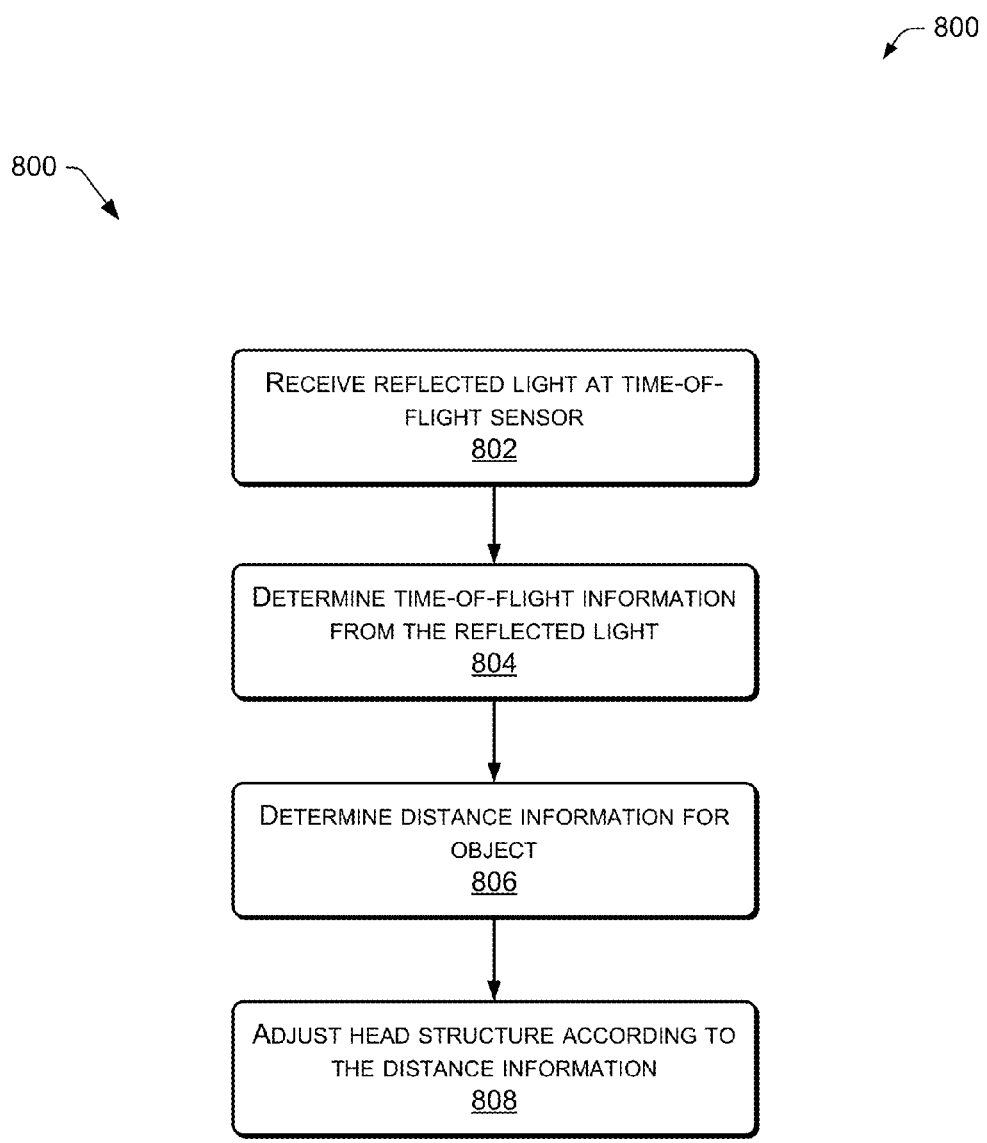
FIGS. 8, 9, and 10 shows illustrative processes of providing an enhanced augmented reality environment using a projection and camera system in a head structure that can be remotely controlled via a remote pull and/or push mechanism from a motor in a base structure.
Figure 9:
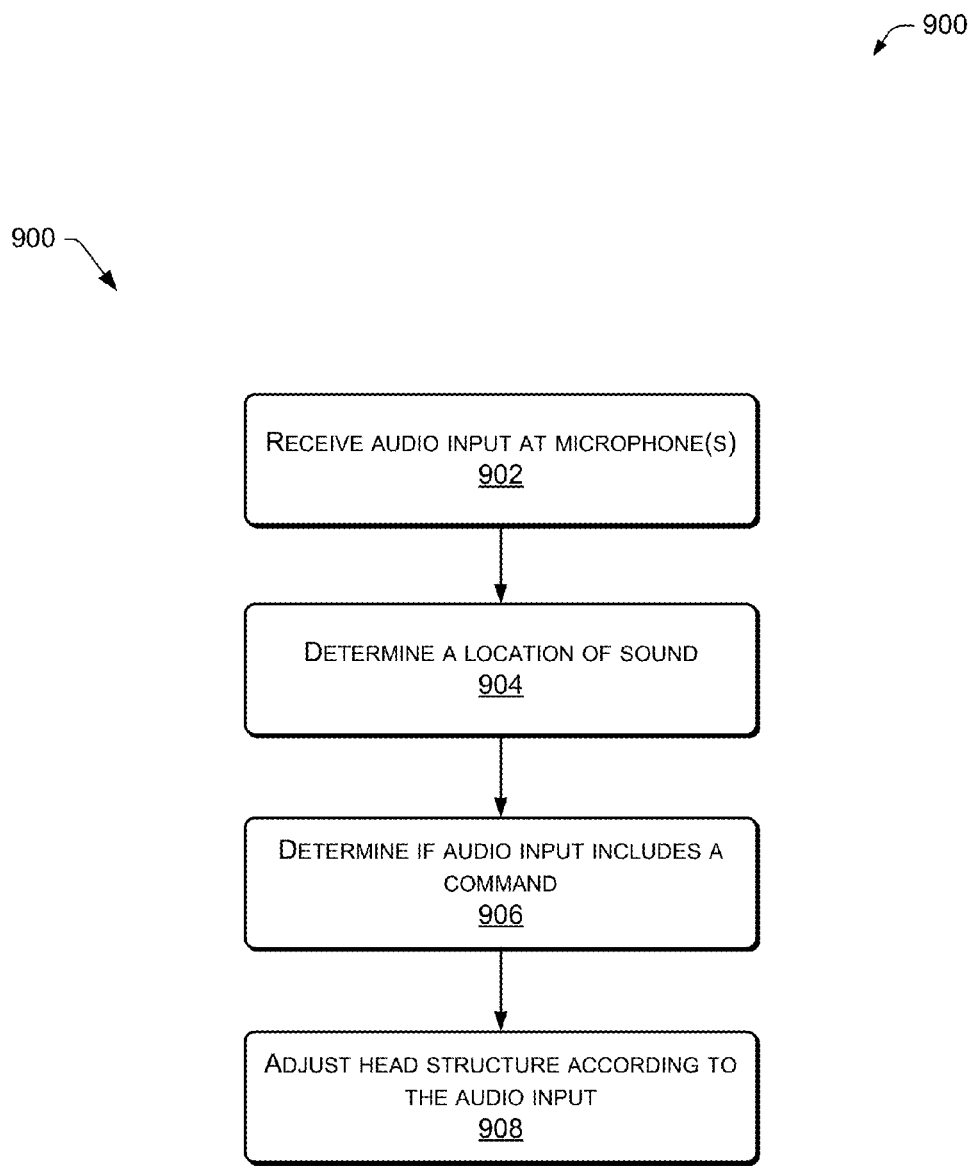
Figure 10:
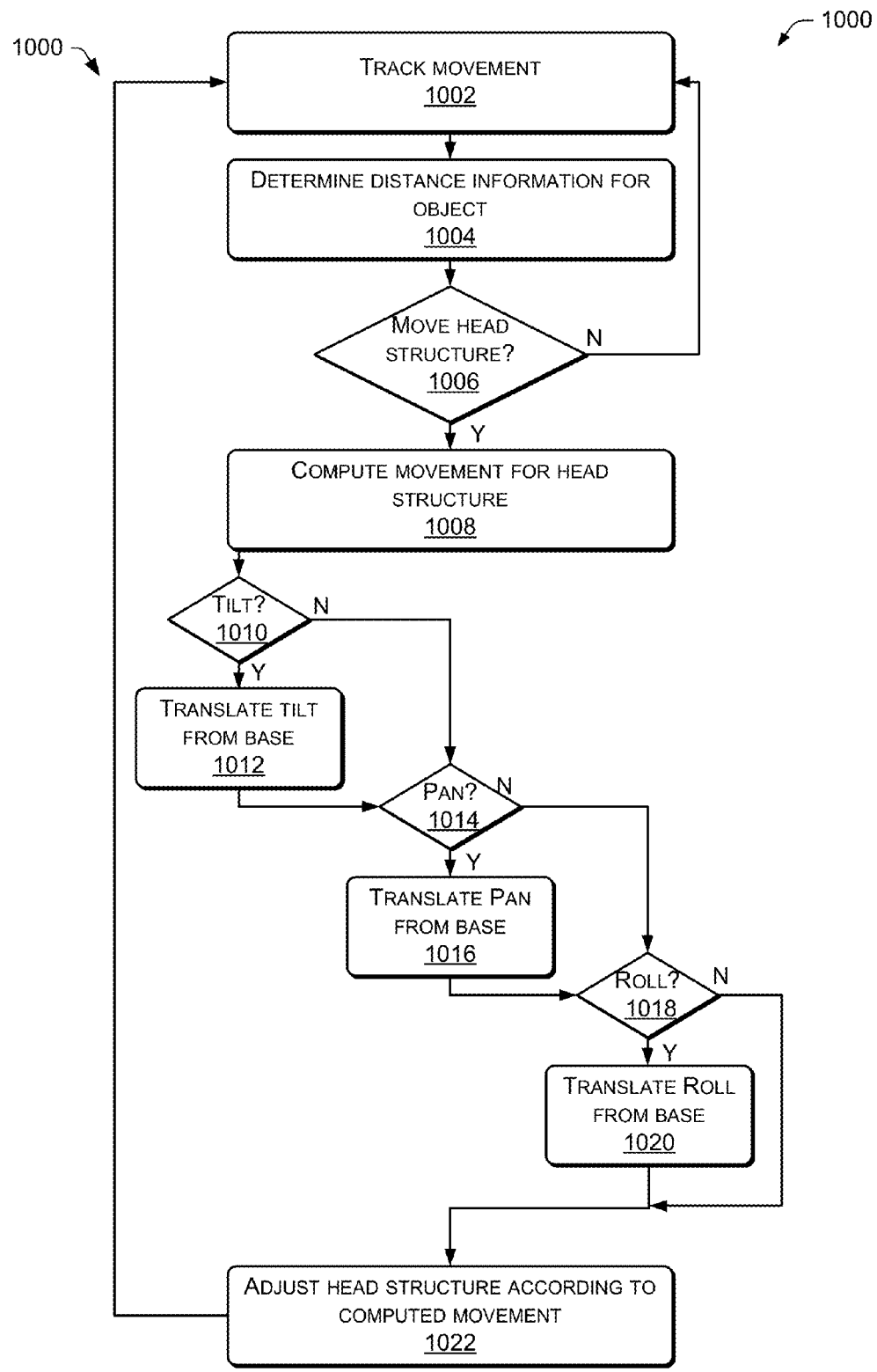

FIGS. 8, 9, and 10 show illustrative processes 800, 900, and 1000 of providing an enhanced augmented reality environment using a projection and camera system, which in some implementations, share a common optical path. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 802, at least a portion of light is received at a time-of-flight sensor in a head structure as shown in the examples of FIGS. 4 and 5. For example, light can be reflected from a scene that is illuminated with IR light. Generally, a time-of-flight sensor measures the time that a pulse of IR light, as emitted by IR LED's in some implementations, takes to leave the IR LED, hit and bounce off an object, then hit an IR sensor. In one implementation, the IR light may be emitted from an array of LEDs or lasers positioned about a lens, as shown in the example of FIG. 4. Alternatively, an IR beam from a laser may be passed through a lens of the ARFN. Scattered IR light from objects in the scene is received along an optical path through a lens and is directed to a time-of-flight camera and/or sensor.

At 804, a time of flight is determined from the scattered IR light. This computation may be made by a depth module 442 (or hardware) in the computer 436 based on a time-of-flight of the IR light from emission to capture by the ToF sensor 418.

At 806, distance information of the one or more objects relative to the time of flight sensor is determined based at least in part on the determined time of flight value. For example, a landscape depth map can be computed based on the time of flight computations. This depth map helps the system understand the location of the one or more objects and the dimensions and layout of the room for purposes of creating an augmented reality environment.

At 808, a motor in a base structure causes adjustment of at least one component housed in the head structure, or the head structure itself according to the distance information.

FIG. 9 shows illustrative process 900 of providing an enhanced augmented reality environment using a projection and camera system including at least one microphone that, in some implementations, can be implemented as part of a lamp-embodied ARFN, such as ARFN 102(2) or 102(3). At 902, at least a portion of audio input is received at a microphone in a head structure as shown in the examples of FIGS. 2, 4, and 5. For example, the microphone can detect a person speaking in the environment. In one implementation, commands can be ascertained in the audio input such as "direct here," "direct to wall," "direct to table," and the like.

At 904, a location of the source of the sound is determined by audio input to multiple microphones (e.g. microphones 220(1) and 220(2). The computer 436 can determine the source location based on time-difference-of-arrival techniques (e.g. using microphones 220(1) and 220(2)) or via other location sensing techniques. At 906, the process 900 determines whether the audio input includes a command (e.g. using speech-recognition techniques).

At 908, a motor in a base structure causes adjustment of at least one component housed in the head structure, or the head structure itself according to the information determined from the audio input. For example, if the process 900 determines that the audio input includes an authorized user speaking "direct here," the tracking and control module 144 may instruct the motor to adjust the head structure toward the user. As another example, if the process 900 determines that the audio input includes the user speaking the command "direct to wall," the known parameters for a wall within the environment can be used to instruct the motor to adjust the head structure to direct output to the wall object 104. These examples are not exclusive and combinations of the above and other audio input are supported.

FIG. 10 shows illustrative process 1000 of providing an enhanced augmented reality environment using a projection and camera system that can include one or more microphones and that, in some implementations, can be implemented as part of a lamp-embodied ARFN, such as ARFN 102(2) or 102(3). At 1002, an input is received by a component of the projection and camera system to ascertain location of an object and track movement. For example, at least a portion of light can be received at a time-of-flight sensor in a head structure, which can perceive changes in location of an object (e.g. as shown in the examples of FIGS. 4 and 5) or an audio input can be received at a microphone in a head structure (e.g. as shown in the example of FIG. 2). In various instances, microphones can be located in other structures than the head, including the base or arm, or in a separate stand-alone unit. The input is employed to track movement of one or more objects in an environment. For instance, a display medium onto which content is projected may be tracked as user moves the display medium though the environment. For instance, the user may move the display medium while a projector within the head structure projects content onto the medium. As another example, a user speaking in an environment may be tracked as the user speaks while moving within the environment, and upon detecting an audio command directing display to an object, a projector within the head structure projects content onto the object corresponding to the audio command.

At 1004, distance information of the one or more objects relative to the time of flight sensor is determined based at least in part on a time-of-flight value determined from the received light indicating a location of the one or more objects. At 1006, meanwhile, the process 1000 determines whether one or more components in the head structure are to be moved (e.g., panned, tilted, rolled) based on the distance information. For instance, the process 1000 may determine whether the head structure or components residing therein (e.g., the ToF sensor, the projector, etc.) should be moved. In one example, it is determined whether to move the head structure to allow the projector to continue projecting content onto the display medium. In another example, it is determined whether to move the head structure to allow the projector to another object corresponding to an audio command.

At 1008, an amount and type of movement of one or more components in the head structure is computed based at least on the distance information. At 1010, the process 1000 determines whether at least one component housed in the head structure, or the head structure itself, should be tilted. At 1012, torque from the motor in the base is translated to the head when it is determined that a component or the head structure should be tilted.

At 1014, the process 1000 determines whether at least one component housed in the head structure or the head structure itself, should be panned. At 1016, torque from the motor in the base is translated to the head when it is determined that a component or the head structure should be panned.

At 1018, the process 1000 determines whether at least one component housed in the head structure or the head structure itself should be rolled. At 1020, torque from the motor in the base is translated to the head when it is determined that a component or the head structure should be rolled.

At 1022, process 1000 proceeds to adjust the head structure. For instance, the process 1000 may adjust the head structure to track a display medium upon which a projector in the head structure projects content. Thereafter, the process may loop back to tracking movement of an object (e.g. the display medium or the user speaking) at 1002.

Given the above techniques, the projection and camera system 102(2) or 102(3) allows for simultaneous and coaxial operation of at least the following functions: (1) visible light high intensity zoomable image projection; (2) illumination of a controlled area of interest with modulated IR light; and (3) collection of scattered IR light from a populated landscape to form an image on a time-of-flight camera/sensor. Furthermore, the described systems enable these features while maintaining a more comfortable noise level about the head structure, given that the motors and other noisy or heat causing components for driving movement of the head structure reside in a base structure of the systems.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   projecting, by a device into an environment, light from a projector in a head structure of the device;
   receiving reflected light at a sensor in the head structure along an optical path in the head structure shared in common by the sensor and the projector, the reflected light being light reflected by one or more objects in the environment;
   determining, by the device, distance information of the one or more objects relative to the sensor, the distance information being based at least in part on the reflected light; and
   adjusting, by the device using a motor residing in a base structure of the device, a position of the head structure or a component housed in the head structure based at least in part on a first distance information associated with a first object of the one or more objects.

2. The method as recited in claim 1, wherein the adjusting includes rotating the head structure or the component about at least two different axes.

3. The method as recited in claim 1, wherein the adjusting includes rotating the head structure or the component about one of: a pan axis, a tilt axis, or a roll axis.

4. The method as recited in claim 1, wherein the adjusting includes rotating the head structure or the component about a pan axis, a tilt axis, and a roll axis.

5. The method as recited in claim 1, wherein the sensor comprises a time-of-flight sensor and determining the distance information comprises:
   determining time-of-flight information associated with the one or more objects based at least in part on the reflected light; and
   determining the distance information associated with the one or more objects relative to the time-of-flight sensor, the distance information being based at least in part on the time-of-flight information.

6. The method as recited in claim 1, wherein the adjusting includes a pull or push action to cause rotation of the head structure or the component.

7. The method as recited in claim 1, wherein the adjusting includes applying torque by the motor in the base structure to a pulley, the torque causing a pull or push action on a member operably connected to the pulley to cause rotation of the head structure or the component.

8. A method comprising:
   receiving reflected light at a sensor in a head structure of a device, the reflected light being light reflected from one or more objects;
   determining, by the device, distance information of the one or more objects relative to the sensor, the distance information being based at least in part on the reflected light; and
   adjusting, by the device using a motor residing in a base structure of the device, a position of the head structure or a component housed in the head structure based at least in part on a first distance information associated with a first object of the one or more objects.

9. The method as recited in claim 8, wherein the adjusting includes rotating the head structure or the component about at least two different axes.

10. The method as recited in claim 8, wherein the adjusting includes rotating the head structure or the component about one of: a pan axis, a tilt axis, or a roll axis.

11. The method as recited in claim 8, wherein the adjusting includes rotating the head structure or the component about a pan axis, a tilt axis, and a roll axis.

12. The method as recited in claim 8, wherein the sensor comprises a time-of-flight sensor and determining the distance information comprises:
   determining time-of-flight information associated with the one or more objects based at least in part on the reflected light; and determining the distance information associated with the one or more objects relative to the time-of-flight sensor, the distance information being based at least in part on the time-of-flight information.

13. The method as recited in claim 8, wherein the adjusting includes a pull or push action to cause rotation of the head structure or the component.

14. The method as recited in claim 8, wherein the adjusting includes applying torque by the motor in the base structure to a pulley, the torque causing a pull or push action on a member operably connected to the pulley to cause rotation of the head structure or the component.

15. A device comprising:
a head structure;
a base structure connected to the head structure;
a sensor housed in the head structure to receive reflected light, the reflected light being light reflected by one or more objects external to the device;
a processor, housed in one of the head structure or the base structure, to determine distance information of the one or more objects relative to the sensor, the distance information determined based at least in part on the reflected light; and
a drive mechanism to receive instructions from the processor to adjust a position of the head structure based at least in part on a first distance information associated with a first object of the one or more objects.

16. The device as recited in claim 15, wherein the head structure is connected to the base structure via a connector that permits rotation about at least two different axes.

17. The device as recited in claim 15, wherein the head structure is connected to the base structure via a connector that permits rotation about one of: a pan axis, a tilt axis, or a roll axis.

18. The device as recited in claim 15, wherein the drive mechanism controls rotation of the head structure about a pan axis, a tilt axis, and a roll axis.

19. The device as recited in claim 15, wherein the drive mechanism comprises a pulley, a motor, a motor controller, and a member operationally connected to the pulley.

20. The device as recited in claim 19, wherein the motor controls the member via the pulley to adjust the position of the head structure.

* * * * *